(12) United States Patent
Won

(10) Patent No.: US 6,265,838 B1
(45) Date of Patent: Jul. 24, 2001

(54) FLAT-SHAPED VIBRATION MOTOR

(75) Inventor: Sung-Hong Won, Seoul (KR)

(73) Assignee: Samsung Electro Mechanics Co., LTD, Kyungki-Do (KR)

( * ) Notice: Subject to any disclaimer, the term of this patent is extended or adjusted under 35 U.S.C. 154(b) by 0 days.

(21) Appl. No.: 09/452,552

(22) Filed: Dec. 1, 1999

(30) Foreign Application Priority Data

Mar. 17, 1999 (KR) .................................................... 99-8994

(51) Int. Cl.$^7$ .................................................... H02K 7/075
(52) U.S. Cl. .......................... 318/114; 310/81; 310/180; 310/184; 310/268; 310/DIG. 6
(58) Field of Search ............... 310/81, 114, 268, 310/179, 180, 184, DIG. 6, 40 MM; 340/407.1; 318/114

(56) References Cited

U.S. PATENT DOCUMENTS

| | | | |
|---|---|---|---|
| 5,036,239 | * | 7/1991 | Yamaguchi ............................ 310/268 |
| 5,175,459 | * | 12/1992 | Danial et al. ............................ 310/81 |
| 5,793,133 | * | 8/1998 | Shiraki et al. ............................ 310/81 |

FOREIGN PATENT DOCUMENTS

| | | | | |
|---|---|---|---|---|
| 63-290141 | * | 11/1988 | (JP) | ................................. H02K/7/075 |
| 7-213008 | * | 8/1995 | (JP) | ................................. H02K/7/075 |
| 8-256449 | * | 10/1996 | (JP) | ................................. H02K/7/075 |
| 10-174361 | * | 6/1998 | (JP) | ................................. H02K/7/075 |
| 10-271743 | * | 10/1998 | (JP) | ................................. H02K/7/075 |

OTHER PUBLICATIONS

Translation of JP 63–290141, Shiraki et al., Nov. 1988.*

* cited by examiner

*Primary Examiner*—Burton Mullins
(74) *Attorney, Agent, or Firm*—Darby & Darby

(57) ABSTRACT

A flat-shaped vibration motor is described. The vibration motor has a base plate at its bottom. A cover is mounted on the base plate so as to define a space for installing elements therein. A shaft is vertically and rotatably mounted between the center of the base plate and the center of the cover. A lower PCB is mounted on the upper surface of the base plate. A magnet is positioned outside the lower PCB and has poles of 2n (n: a positive integer). An upper plate is fitted around the shaft and unbalanced in weight. A commutator is positioned on the central lower portion of the upper PCB and consists of multiple segments. A pair of brushes are mounted between the lower PCB and the commutator with their lower ends respectively and electrically connected to the lower PCB and their upper ends in contact with the commutator, an interval angle between the brushes being greater than an electric angle of Π/2 and less than an electric angle of 3Π/2. A coil unit consists of multiple elemental armature coils, the armature coils being connected to each other into the coil unit at a neutral point and being orderly activated, and each having an electric phase difference increasing by Π/2 in the order of activation.

5 Claims, 10 Drawing Sheets

FLAT-SHAPED VIBRATION MOTOR

BACKGROUND OF THE INVENTION

1. Field of the Invention

The present invention relates, in general, to vibration motors and, more particularly, to a flat-shaped vibration motor having a stable driving characteristic.

2. Description of the Prior Art

One of the important functions in a general communication terminal is a call receiving function. The call receiving function may be performed by indicating a call reception by means of an audible indication, a visible indication or other recognizable indications on a communication terminal in response to a call signal for a switching station as well as closing a talking circuit.

On the other hand, of the recognizable indications, the most popular recognizable indication is to indicate a call reception by means of vibrations because this indication does not cause excessive noise in a crowded place.

As well known to those skilled in the art, the vibrations may be generated by a vibration motor. That is, a small-sized vibration motor is operated and the vibrating force of the operated vibration motor is transmitted to the casing of a communication terminal, so that the casing of the communication is finally vibrated. A user knows of a call reception by recognizing the vibration of the casing.

FIG. 1 is a cross section showing a conventional flat-shaped vibration motor.

The conventional flat-shaped vibration motor comprises a base plate 1 at its bottom. A shaft 2 is vertically mounted in the center of the base case 1. A lower PCB (Printed Circuit Board) 3 is seated on the upper surface of the base case 1, the lower PCB 3 having a circuit through which electric power is supplied. In detail, the lower PCB 3 is mounted in the hollow seating recess, the seating recess being formed on the upper portion of the base case 1. A doughnut magnet 4 is mounted on the upper surface of the lower PCB 3, north poles and south poles being alternately and regularly arranged to have regular intervals along the circle of the doughnut magnet 4. Two brushes 5 are mounted to the lower PCB 3, with the lower ends of the brushes 5 being respectively connected to the input and output terminals of the lower PCB 3, the upper ends of the brushes 5 being positioned higher than the upper surface of the magnet 4, the brushes 5 being spaced apart from each other by a certain angle. An upper PCB (Printed Circuit Board) 7 is fitted around the lower portion of a bearing 7a, the upper PCB 7 having a shape unbalanced in weight, the bearing being fitted around the upper portion of the shaft 2. A commutator 8 consisting of multiple segments is positioned beneath the upper PCB 7, around the bearing 7a and in contact with the upper ends of the brushes 5. A coil unit 9 is mounted on the unprinted portion of the upper PCB 7, the number of the elemental armature coils of the coil unit 9 being determined according to a driving system of the vibration motor. For example, one armature coil, two armature coils and three armature coils may be respectively employed in the vibration motors of a single phase driving system, a two-phase driving system and a three-phase driving system. When two or more armature coils are employed in the motor, they are spaced apart from each other by a certain angle. The portion, on which the armature coil or coils are not mounted, is provided with insulation 7b so as to insulate the armature coils 9 from each other and increase the unbalance in weight. The insulation 7b may be integrated with the upper PCB 7 into a single body through an insert injection process. A cover 6 is put on the base plate 1 and holds the upper end of the shaft 2.

In brief, the conventional vibration motor consists of a stator and a rotor. The stator comprises the base plate 1, the shaft 2, the lower PCB 3, the magnet 4, the brushes 5 and cover 6, while the rotor comprises the upper PCB 7, the commutator 8 and the coil unit 9.

The conventional vibration motor is operated as described below.

When external power is supplied through the lower PCB 3, the power is introduced to the commutator 8 through the brush 5. After that, the power is supplied from the commutator 8 to the armature coil or coils 8 through the printed circuit of the upper PCB 7. As a result, the electromagnetic force is generated by an interaction between magnetic fluxes of the armature coil or coils 8 and the magnet 4, thereby rotating the rotor. In detail, the electromagnetic force is converted into an unbalanced rotating force because the rotor of the motor is unbalanced in weight. The unbalanced force is transmitted to the base plate 1 and the cover 6 through the shaft 2, so that a user recognizes vibrations of the motor. The three-phase driving system has been employed so far, but simply structured single phase and two-phase driving systems begin to be employed as the systems are developed. However, the single phase and two-phase driving systems are problematic in that the driving of the motor becomes unstable compared with the two-phase driving system because the continuous driving force is not maintained.

That is, in the single driving system, when the rotor is rotated by the electromagnetic force generated by the interaction between magnetic fluxes of the coil and the magnet, there occurs a dead point in which the driving force is eliminated upon changes of polarities due to directional change of current in the coil.

In order to solve such a problem, for the single driving system, there are provided a cogging generating device wherein a proper cogging is generated in the dead point, thus allowing a continuous driving to be performed. However, since the cogging generating device is of minute size, it is very difficult to mount on a precise position. Therefore, this renders productivity of the motor to be reduced, and generates position deviations in manufactured motors, thereby causing torque deviations in the manufactured motors.

On the other hand, in regard to the two-phase driving system, power should be introduced to at least one of the two-phase armature coils 9 and, to this end, a pair of brushes connected to the commutator 9 have a certain interval angle therebetween. That is, when the number of the commutator segments is "n", the interval angle between a brush and an adjacent brush should be 360°·2/n. For example, the interval angle between a brush and an adjacent brush should be 180° as shown in FIG. 2 when the number of the commutator segments is four, and 90° as shown in FIG. 3 when the number of the commutator segments is eight.

However, when an actual interval angle between two brushes is less or greater than the above described standard angle, the dead point occurs because the brushes 5 are respectively connected to the armature coils 9 having different phases.

Therefore, in a two-phase driving system, the interval angle between the brushes, which contact the commutator 8, should be kept correct. However, since it is almost impossible to connect two brushes 5 to the lower PCB 3 at an exact interval angle, mechanical errors occur, thereby causing bad driving performance and defective in manufactured products.

SUMMARY OF THE INVENTION

Accordingly, the present invention has been made keeping in mind the above problems occurring in the prior art, and an object of the present invention is to provide a flat-shaped vibration motor, having a two-phase half-wave characteristic and four-phase driving characteristic at the same time regardless of the interval between brushes, thus providing a stable driving.

Another object of the present invention is to provide a flat-shaped vibration motor, allowing brushes to be easily assembled together by rendering the interval angle between brushes to be freely set, thus improving its productivity.

In order to accomplish the above object, the present invention provides a flat-shaped vibration motor comprising a base plate, a cover covering the base plate so as to define a space for installing elements therein, a shaft vertically and rotatably mounted between the center of the base plate and the center of the cover, a lower PCB mounted on an upper surface of the base plate, a magnet being positioned outside the lower PCB and having poles of 2n (n: a positive integer), an upper plate fitted around the shaft and unbalanced in weight, a commutator being positioned on the central lower portion of the upper PCB and consisting of multiple segments, a pair of brushes mounted between the lower PCB and the commutator with their lower ends respectively and electrically connected to the lower PCB and their upper ends in contact with the commutator, an interval angle between the brushes being greater than an electric angle of $\Pi/2$ and less than an electric angle of $3\Pi/2$ and a coil unit consisting of multiple elemental armature coils, the armature coils being connected to each other into the coil unit at a neutral point and being orderly activated, and each having an electric phase difference increasing by $\Pi/2$ in the order of activation.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
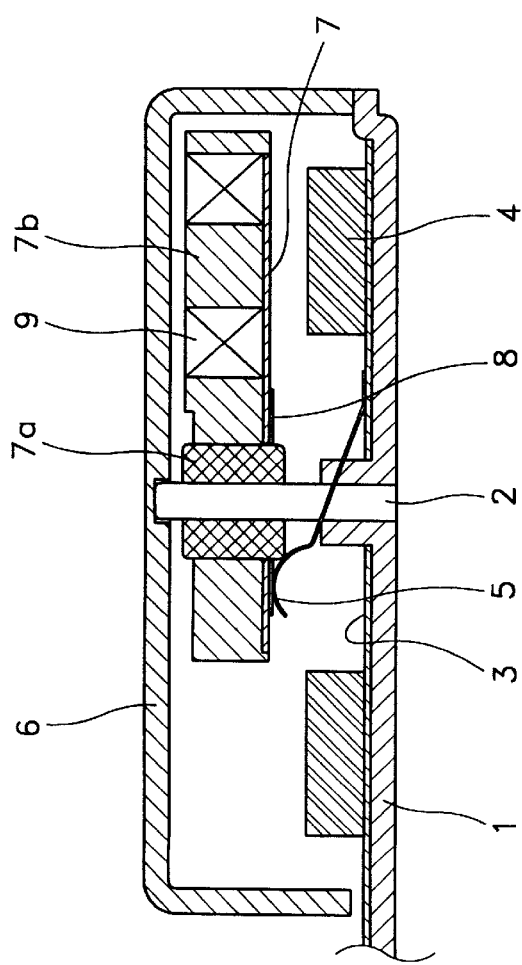
FIG. 1 is a cross section showing a conventional flat-shaped vibration motor.
Figure 2:
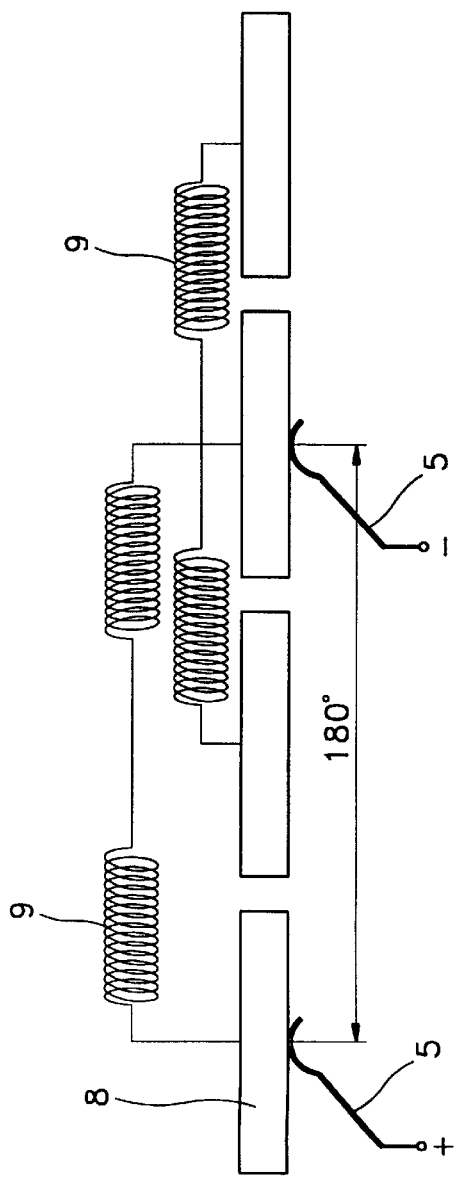
FIG. 2 is a connecting diagram showing connections between brushes and a commutator having four segments in two-phase driving vibration motor.
Figure 3:
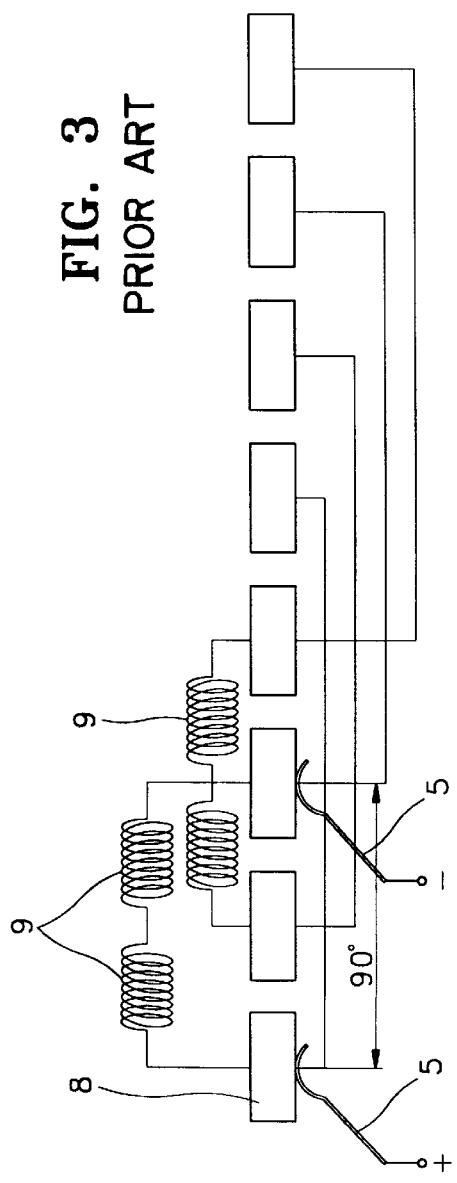
FIG. 3 is a connecting diagram showing connections between brushes and a commutator having eight segments in a two-phase driving vibration motor.
Figure 4:
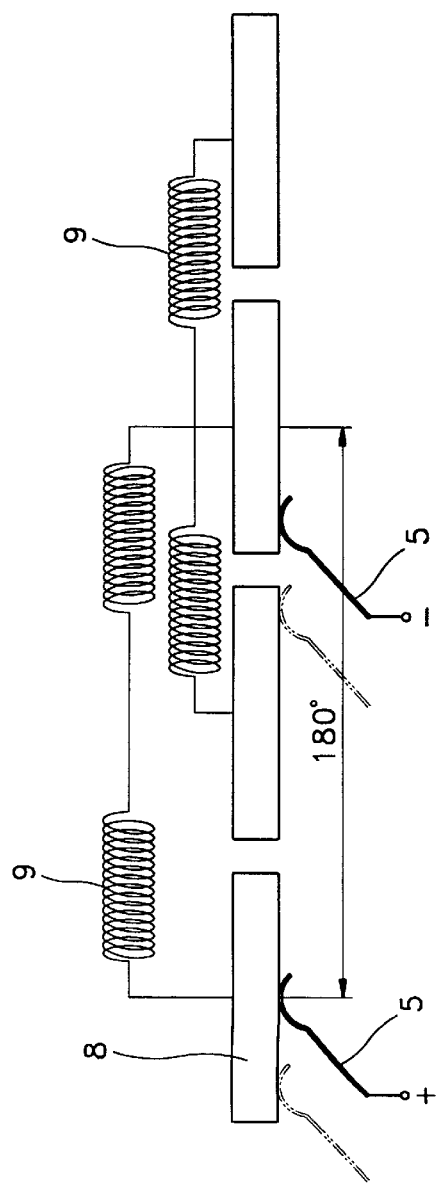
FIG. 4 is a connecting diagram showing connections between brushes and a commutator having four segments in a two-phase driving vibration motor when an interval angle is less than 180°.
Figure 6:
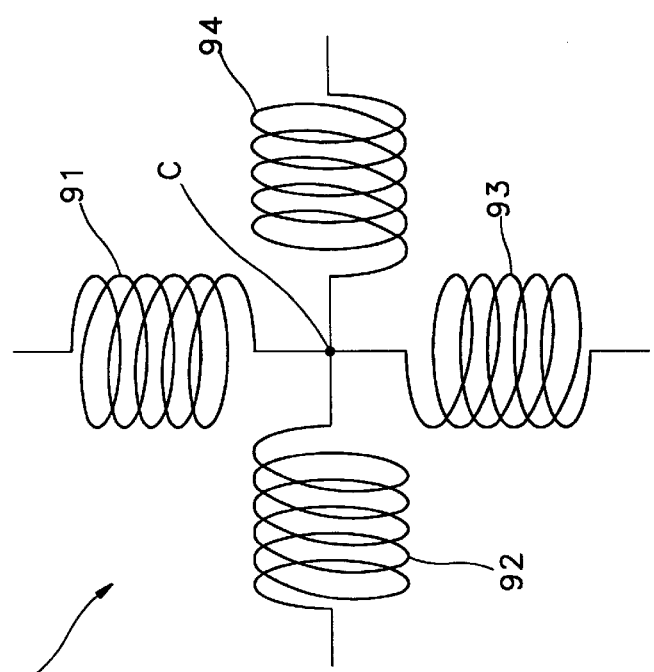
FIG. 6 shows a coil unit in accordance with this invention.
Figure 5:
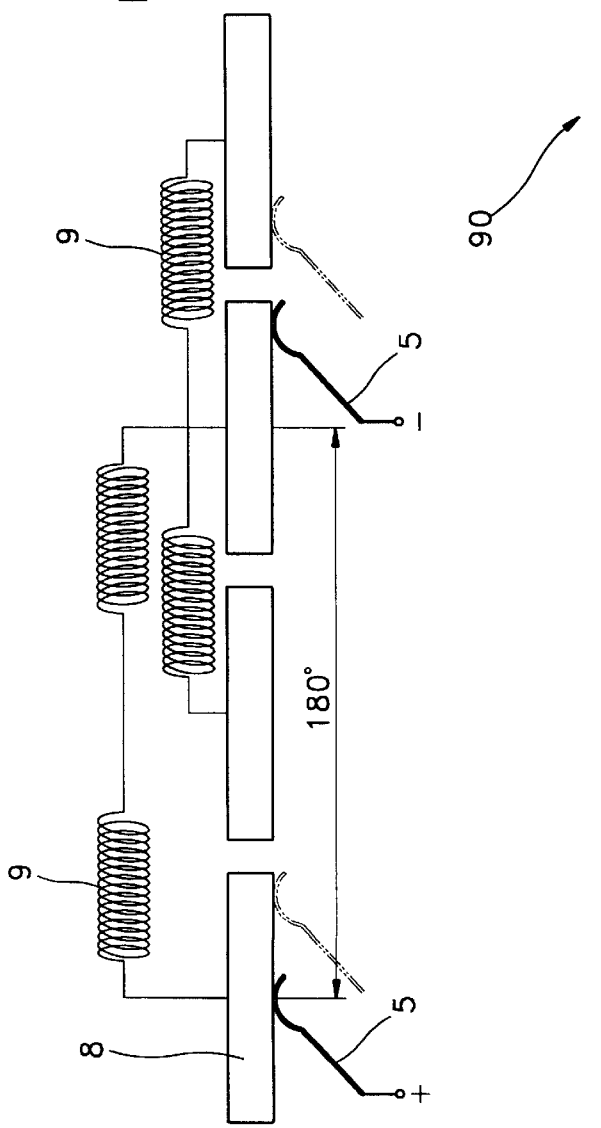
FIG. 5 is a connecting diagram showing connections between brushes and a commutator having four segments in a two-phase driving vibration motor when an interval angle is greater than 180°.

As shown in FIG. 6, a flat-shaped vibration motor according to an embodiment of this invention comprises a coil unit 90. The coil unit 90 consists of four elemental armature coils 91, 92, 93 and 94, the armature coils 91, 92, 93 and 94 being connected to each other at a neutral point C, thus rendering the motor to have a four-phase driving characteristic as well as a two-phase driving characteristic.

Figure 7:
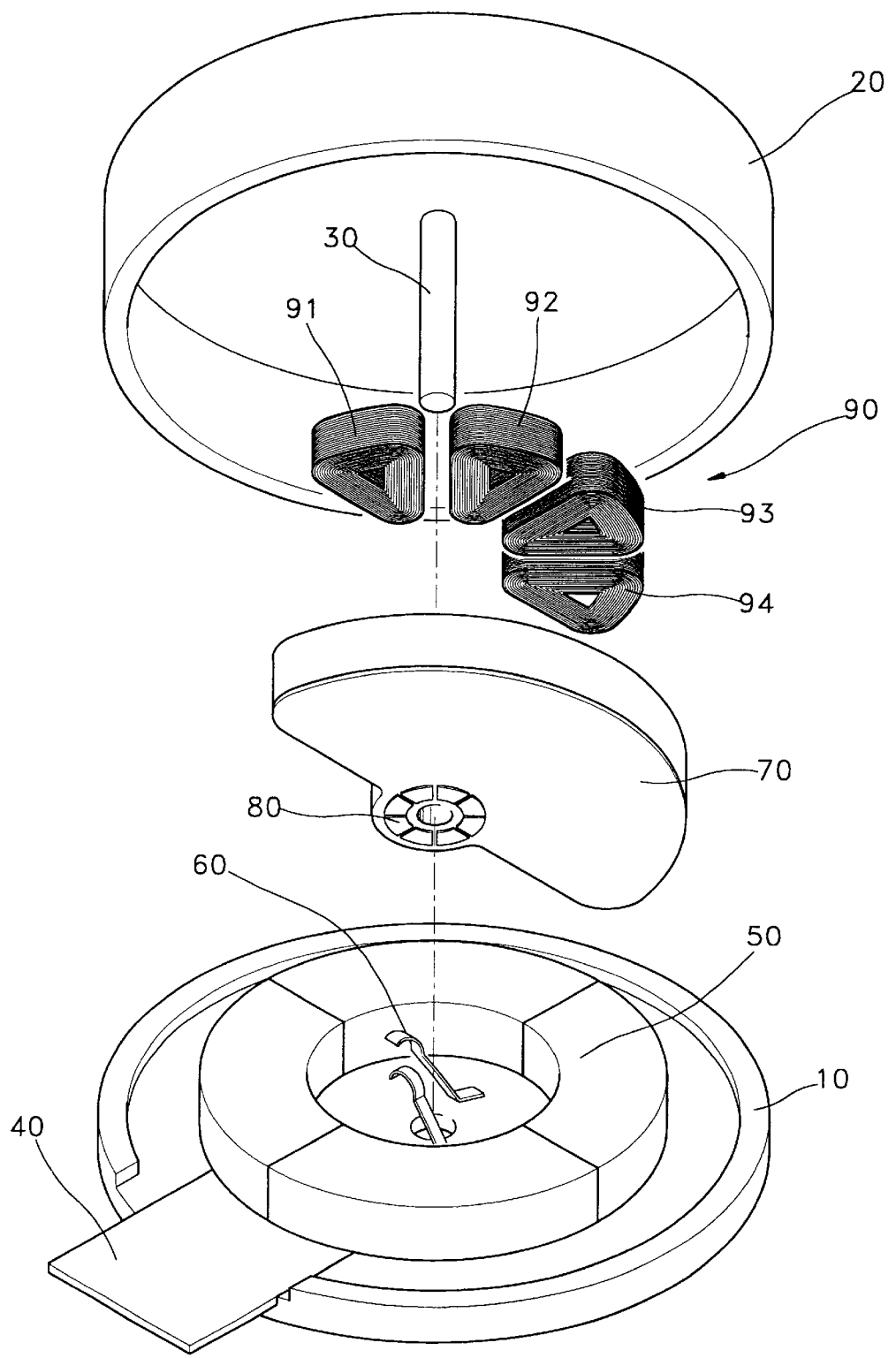
FIG. 7 is an exploded perspective view showing a motor according to an embodiment of this invention.

Referring to FIG. 7, it is understood that a stator consists of a base plate 10, a shaft 30, a lower PCB (Printed Circuit Board) 40, a doughnut magnet 50, two brushes 60 and a cover 20, while a rotor comprises the upper PCB 70, a commutator 80 and the coil unit 90, the rotor being unbalanced in weight.

The cover 20 is mounted on the base plate 10 so as to define a space for installing elements therein, with the shaft 30 connecting the center of the cover 20 with the center of the base plate 10.

The lower PCB 40 is seated on the center portion of the upper surface of the base plate 10, the lower PCB 3 having a printed circuit through which electric power is supplied. The doughnut magnet 50 is mounted on the upper surface of the base plate 10. The north poles and south poles of the magnet 50, the number of which is 2n (n: a positive integer), are alternately and regularly arranged to have regular intervals along the circle of the doughnut magnet 50. The number of the poles of the magnet 50 is preferably two, three, four, five or six so as to reduce the number of the parts of the motor because the number of the parts depends on the number of the poles of the magnet.

The upper PCB 70 is rotatably fitted around the shaft 30, the upper PCB 70 having a shape unbalanced in weight. The upper PCB 70 is provided with a printed circuit at its bottom surface.

Since the upper PCB 70 is unbalanced in weight, the upper PCB 70 is rotated, thus generating an eccentric force.

The commutator 80 consisting of multiple segments is positioned on the central lower portion of the upper PCB 70 adjacent to the shaft 30. The number of the commutator segments is generally double the number of the poles of the magnet 50.

Two brushes 60 are mounted between the lower PCB 40 and the commutator 80, with the lower ends of the brushes 60 being respectively and electrically connected to the lower PCB 40 and the upper ends of the brushes 60 being in contact with the commutator 80. The brushes 60 are spaced apart from each other by a certain interval angle, the interval angle being greater than an electric angle of Π/2 and less than an electric angle of 3Π/2. Of the two brushes 60, one brush 60 performs a power input function by inputting to the commutator 80 the power introduced into the lower PCB 40, while the other brush 60 performs a power output function by outputting to the lower PCB 40 the power introduced to the commutator 80.

According to a feature of this invention, the upper PCB 70 is provided with the coil unit 90 at its upper surface, the coil unit 90 being connected to the circuit printed on the bottom surface of the upper PCB 70, the coil unit 90 consisting of four armature coils 91, 92, 93 and 94.

The first, second, third and fourth armature coils 91, 92, 93 and 94 are arranged according to the order in which power is inputted by the contact between the brush 60 and commutator segment. Each of the armature coils 91, 92, 93 and 94 is connected to the circuit printed on the upper PCB 70 at its one end and is commonly connected to the other armature coils at its other end, that is to say, a common connecting point C.

According to another feature of this invention, there is a phase difference of Π/2 between each of the armature coils 91, 92, 93 and 94 and the next armature coil according to the order of activation. That is, each of the second and fourth armature coils 92 and 94 has a phase difference of Π/2 with regard to the first armature coil 91, each of the first and third armature coils 91 and 93 has a phase difference of Π/2 with the second armature coil 92, each of the second and fourth armature coils 92 and 94 has a phase difference of Π/2 with regard to the third armature coil 93 and the third and first armature coils 93 and 91 has a phase difference of Π/2 with regard to the fourth armature coil 94.

In order to render each of the armature coils to have the phase difference, the armature coils may be arranged in various ways as described in the below described embodiments.

Figure 8:
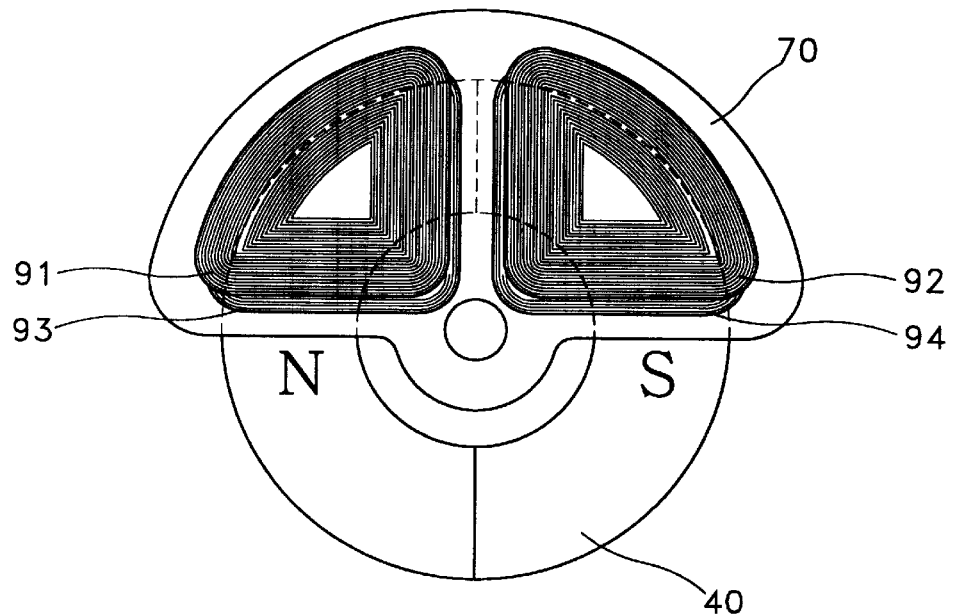
FIG. 8 is a plan view showing an arrangement of a coil unit in a motor having a four-polar magnet.

FIG. 8 shows an embodiment wherein the magnet 50 is two-polar.

In the embodiment, each of the armature coils has a coil pitch of an electric angel of Π/2, armature coils wound in the same direction are spaced apart from each other by an electric angle of Π/2 and armature coils wound in opposite directions are stacked.

As a result, the upper PCB 70 is provided with two coil stacks, each of the coil stacks being made by stacking two coils wound in opposite directions. The two coil stacks are spaced apart from each other by an electric angle of Π/2, thus allowing the coil stacks to have a phase difference according to the interval angle. As shown in FIG. 8, the upper surface of the upper PCB 70 is provided with a first coil 91 at one side and a second coil 92, wound in the same direction as the first coil 91 is wound, at a position which is spaced apart by the electric angle of Π/2.

The third and fourth armature coils 93 and 94, which are wound in a direction opposite to a wound direction of the first and second armature coils 91 and 92, is on the first and second armature coils 91 and 92, respectively.

As a result, since the first and second armature coils 91 and 92 are spaced apart by an electric angle of Π/2 and the first and second armature coils 91 and 92 are respectively stacked on the third and fourth armature coils 93 and 94, there is a phase difference of an electric signal cycle between the first and second coils 92, between the second and third armature coils 92 and 93, between the third and fourth armature coils 93 and 94 and between the fourth and first coils 94 and 91.

Figure 9:
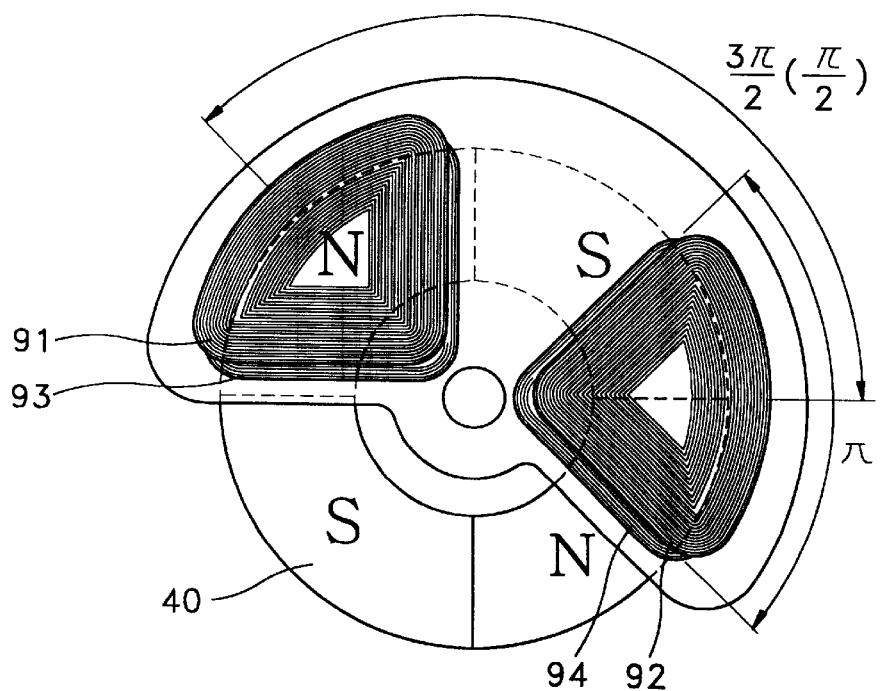
FIG. 9 is a plan view showing an arrangement of a coil unit in a motor having a two-polar magnet.

The coil unit 90 may be applied to a four-polar magnet 50, the coil unit 90 consisting of a pair of coil stacks, each of the stacks being made by stacking two coils wound in opposite directions and having an electric phase difference of Π/2. However, in the four-polar magnet 50, the pitch of the coil unit 90 may be Π or Π/2. The coil pitch for the four-polar magnet 50 is identical to the coil pitch of Π/2 in respect of mechanical angle. As shown in FIG. 9, when the coil pitch is an electric angle of Π, the coil stacks may not be spaced apart from each other by Π/2. That is, when two coil stacks having the coil pitch of Π are spaced apart from each other by the electric angle of Π/2 in the four-polar magnet, a problem occurs in that one coil stack overlaps the other coil stack. Since the height of the coils becomes excessively great when one coil stack overlaps the other coil stack, this may not be allowed due to space limitation in the motor. In result, the coil stacks are preferably spaced apart from each other by an electric angle of 3Π/2, which generates the same electric characteristic as the electric angle of Π/2. In more detail, the electric characteristic having the electric angle of Π/2 in a normal direction is identical to the electric characteristic having the electric angle of Π/2 in a reverse direction. The position having the electric angle of Π/2 in the reverse direction is identical to the position having the electric angle of 3Π/2 in the normal direction in a four-phase structure.

For example, if a total phase angle is 2Π, there may be an electric phase difference of Π/2 between one armature coil and the other armature coil when the electric phase difference is measured from the other armature coil along the rotating direction of the upper PCB 70, one armature coil being situated at a position where its phase angle is 3Π/2 and the other coil where its phase angle is zero. That is, the phase angle may be 3Π/2 or Π/2 according to from which coil the phase angel is measured. However, in this embodiment, an electric phase difference may be maintained by rendering a phase angle to be 3Π/2.

Therefore, in the structure wherein the coil pitch is the electric angle of Π and, thus, large, the two coil stacks are arranged on a single plane of the upper surface of the upper PCB 70 by spacing the two coil stacks apart from each other by an electric angle of 3Π/2, thereby overcoming the space limitation in arrangement of the coil unit.

On the other hand, in the structure of the four-polar magnet, four coils respectively having four different phases may be arranged in a single plane by reducing the pitch of each of the coils. At this time, the wound directions of the coils are the same.

Figure 10:
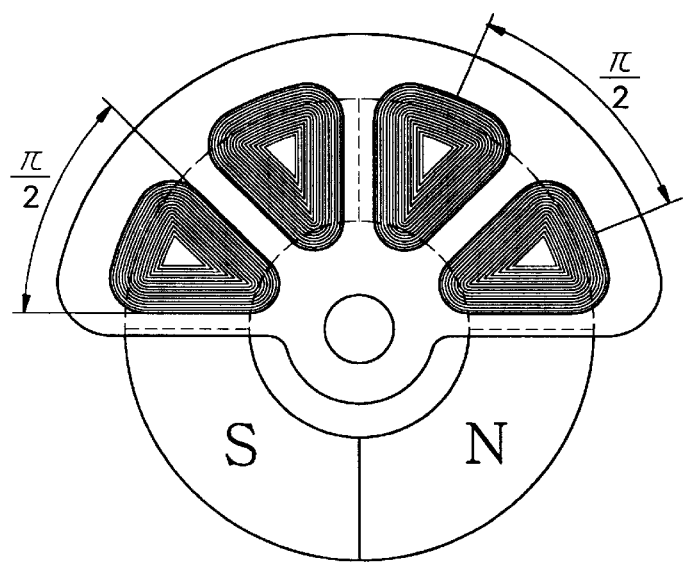
FIG. 10 is a plan view showing another arrangement of a coil unit in a motor having a four-polar magnet.

That is, as shown in FIG. 10, the pitch of the armature coils is set to be Π/2 which is smaller than in the above-described embodiment, the armature coils are arranged in order according to the rotating direction of the upper PCB 70, that is to say, the order of activation and the armature coils are regularly spaced apart from each other by the electric angle of Π/2. In addition, the armature coils respectively having different phases are commonly connected at the common connecting point C and current flows into the armature coils in order from the time when external power is supplied, thereby maintaining a stable driving state.

On the other hand, four armature coils are arranged to respectively have an electric phase difference of Π/2 toward the rotating direction of the upper PCB 70 and the interval angle of two brushes 60 which connects the lower PCB 40 to the segment of the commutator 80 is different according to a two-polar magnet and a four-polar magnet.

At this time, the interval angle of the brushes 60 is restricted to the range greater than Π/2 and less than 3Π/2.

Figure 11:
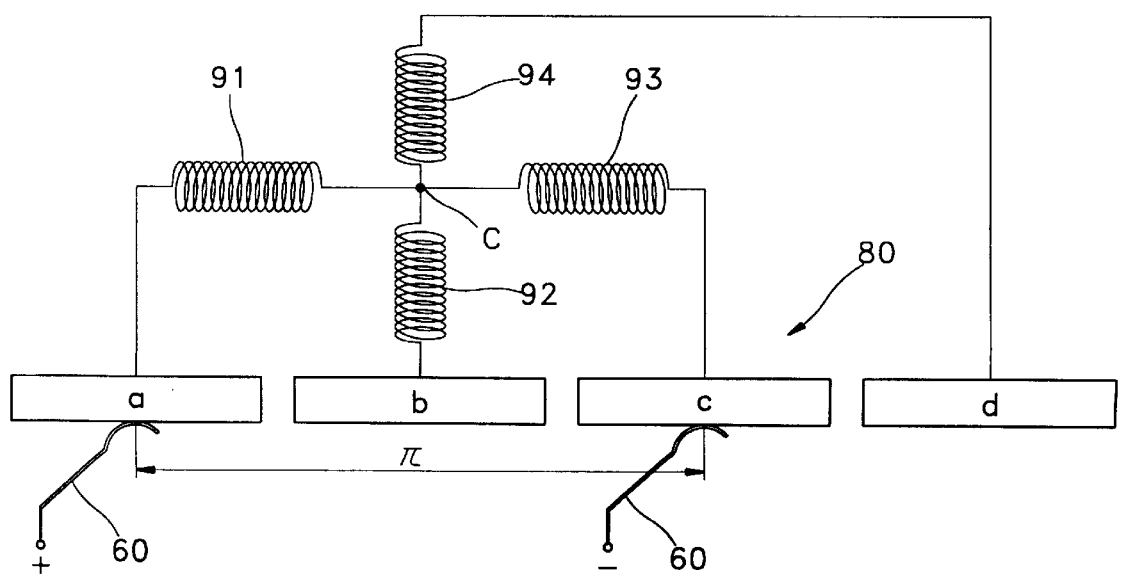
FIG. 11 is a connecting diagram showing connections between brushes and a commutator.

FIG. 11 schematically illustrates a circuit wherein the magnet 50 has two poles and an interval angle of brushes 60 to be contacted with the commutator 80 is greater than an electric angle of Π/2 and less than an electric angle of 3Π/2 (a mechanical angle greater than 0° and less than 270°). Four armature coils, that is, a first coil 91, a second coil 92, a third coil 93 and a fourth coil 94 are respectively connected to a first segment "a", a second segment "b", a third segment "c" and a fourth segment "d" at their first ends and are connected to each other at the neutral point C at their second ends.

Figure 12:
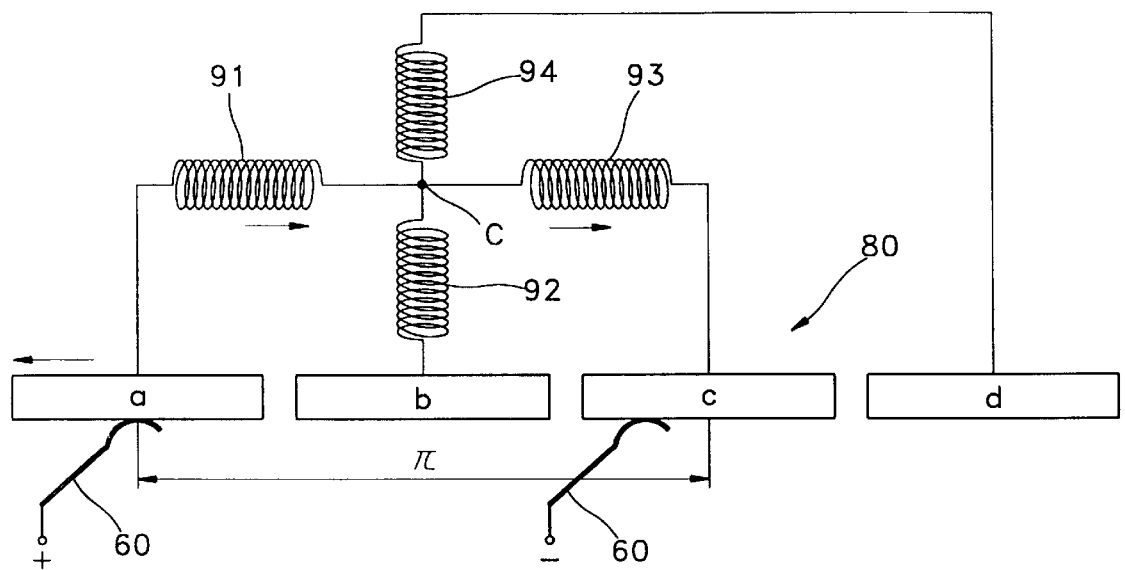
FIG. 12 is a connecting diagram showing connections between brushes and a commutator when a magnet is two-polar and an interval angle between two brushes is greater than an electric angle of $\Pi/2$ and lower than an electric angle of $\Pi$.

FIG. 12 shows the operation of the circuit wherein an interval angle between the brushes 60 is greater than Π/2 and less than Π. The commutator segments contacted by the brushes 60 while the upper PCB 70 is rotated are listed in the following table 1.

TABLE 1

|  | Power input brush | Power output brush |
| --- | --- | --- |
| First stage | a | b |
| Second stage | a | c |
| Third stage | b | c |
| Fourth stage | b | d |
| Fifth stage | c | d |
| Sixth stage | c | a |
| Seventh stage | d | a |
| Eighth stage | d | b |

As known in table 1, in the circuit having the 2-polar magnet 50, the power input brush 60 is in electric communication with the power output brush 60 through the segments of the commutator 80 and the coil 90.

When the power input brush 60 exactly contacts a segment "a" as shown in FIG. 12, the output brush 60 comes into contact with a segment "a" or segment "b", or the segment "a" and segment "b" at the same time. Therefore, although power is supplied through one commutator segment, the power is inputted through one or two segments upon passing the neutral point C, thus allowing the power to be applied to the coil unit 90. As a result, an interaction between the coil 90 and the magnet 50 generates driving force, thus rotating the upper PCB around the shaft 30.

On the contrary, when the input brush 60 contacts two segments at the same time, current passes through the neutral point C through two segments and two armature coils, passes through one coil and one segment and is outputted through the output brush 60 because the output brush 60 contacts only one segment That is, for the most part, the power is supplied to the coil unit 90 while current flows through one coil and one segment, passes through the neutral point C and flows through other one coil and other one segment, as shown in the drawing. However, when one of the two brushes contacts two segments at the same time, the power is supplied to the coil unit 90 while current is inputted or outputted through two segments. Consequently, since the power is continuously supplied to the coil unit 90, the interaction between the coil unit 90 and the magnet 50 generates driving force, thus rotating the upper PCB 70.

Figure 13:
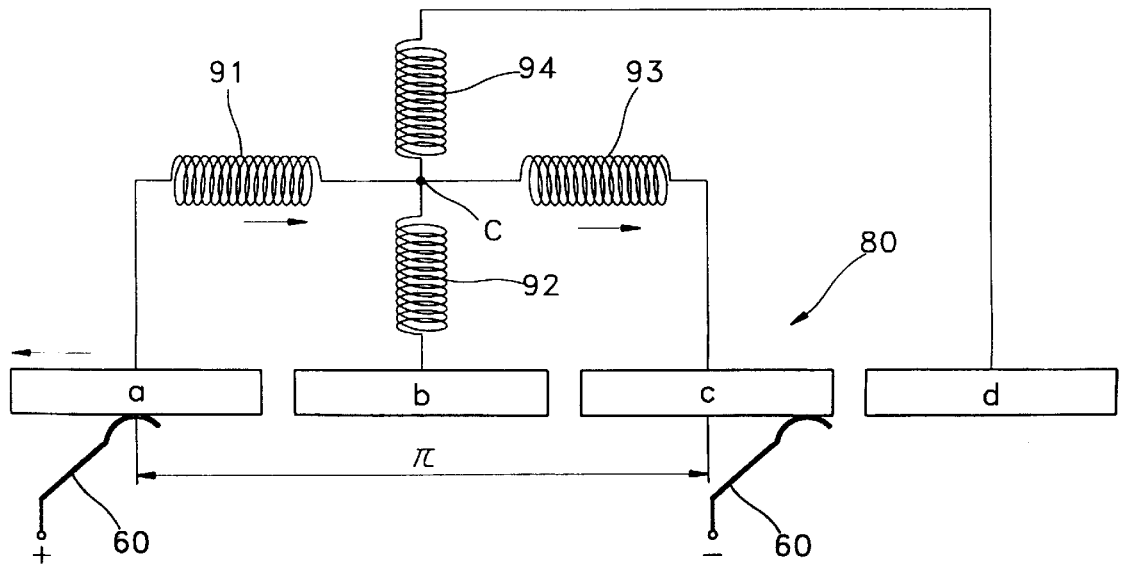
FIG. 13 is a connecting diagram showing connections between brushes and a commutator when a magnet is two-polar and an interval angle between two brushes is greater than an electric angle of $\Pi$ and less than an electric angle of $3\Pi/2$.

FIG. 13 schematically illustrates a circuit wherein the magnet 50 has two poles and an interval angle of brushes 60 to be contacted with the commutator 80 is greater than an electric angle of Π and less than an electric angle of 3Π/2 (a mechanical angle greater than 180° and less than 270°). The commutator segments contacted by the brushes 60 while the upper PCB 70 is rotated are listed in the following table 2.

TABLE 2

|  | Power input brush | Power output brush |
| --- | --- | --- |
| First stage | a | c |
| Second stage | a | d |
| Third stage | b | d |
| Fourth stage | b | a |
| Fifth stage | c | a |
| Sixth stage | c | b |
| Seventh stage | d | b |
| Eighth stage | d | c |

As known in table 2, in the circuit having the 2-polar magnet 50, when an interval angle is greater than an electric angle of Π and less than an electric angle of 3Π/2, the power is continuously supplied to the coil unit 90 as in the above-described embodiment.

When the power input brush 60 exactly contacts a segment "a" as shown in FIG. 13, the output brush 60 comes into contact with a segment "c" or segment "d", or the segment "c" and segment "d" at the same time.

On the contrary, when the input brush 60 contacts two segments at the same time, the output brush 60 should contact only one segment.

Therefore, even though the upper PCB 70 is situated at any rotated position, power is continuously supplied to the coil unit 90. Therefore, driving force is generated by interaction between the coil unit 90 and the magnet 50, thereby rotating the upper PCB 70.

Figure 14:
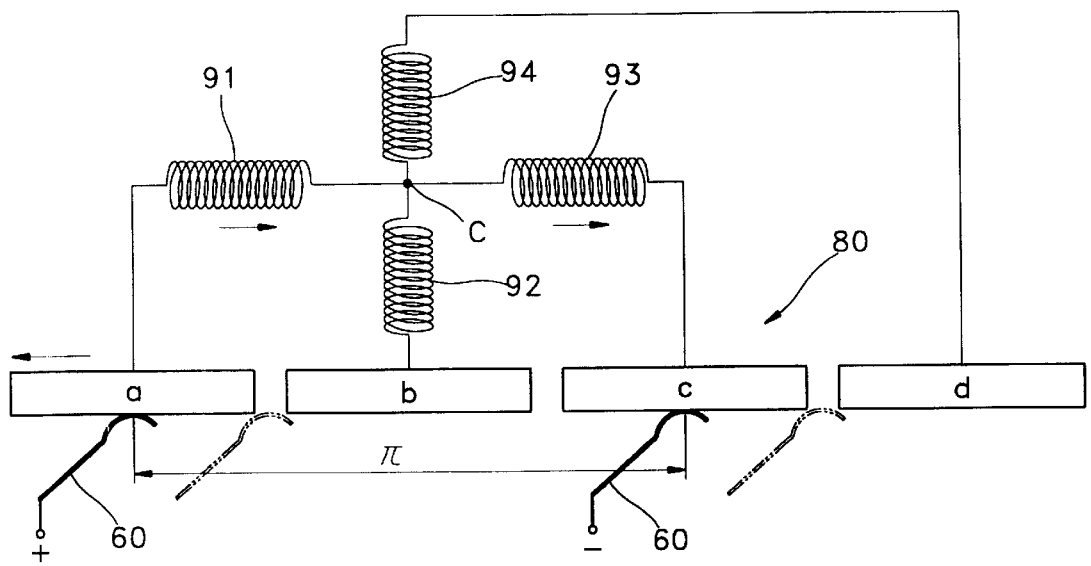
FIG. 14 is a connecting diagram showing connections between brushes and a commutator when a magnet is two-polar and an interval angle between two brushes is an electric angle of $\Pi$.

On the other hand, when an interval angle between two brushes 60 to be contacted with the segment of the commutator 80 is exactly an electric angle of Π (a mechanical angle of 180°) as shown in FIG. 14, each of the brushes 60 contacts one segment or each of the brushes 60 contacts two segments at the same time.

That is, when each of the input brush 60 and the output brush 60 contacts one segment, a signal having an electric phase angle of Π/2 is inputted from each of the armature coils. On the other hand, when the input brush 60 and the output brush 60 respectively contact two adjacent segments at the same time, current flows through four armature coils of the coil unit 90 at the same time.

A four-phase driving characteristic appears when each of the two brushes contacts one segment, while a 2-phase half-wave driving characteristic appears when each of the two brushes contact two segments.

When the four armature coils are arranged to individually have an electric phase difference of Π/2, current is introduced to the coil unit 90 all the time, thus continuously generating driving force. Additionally, since an interval angle between the brushes 60 may be freely set, the motor is easily manufactured.

Figure 15:
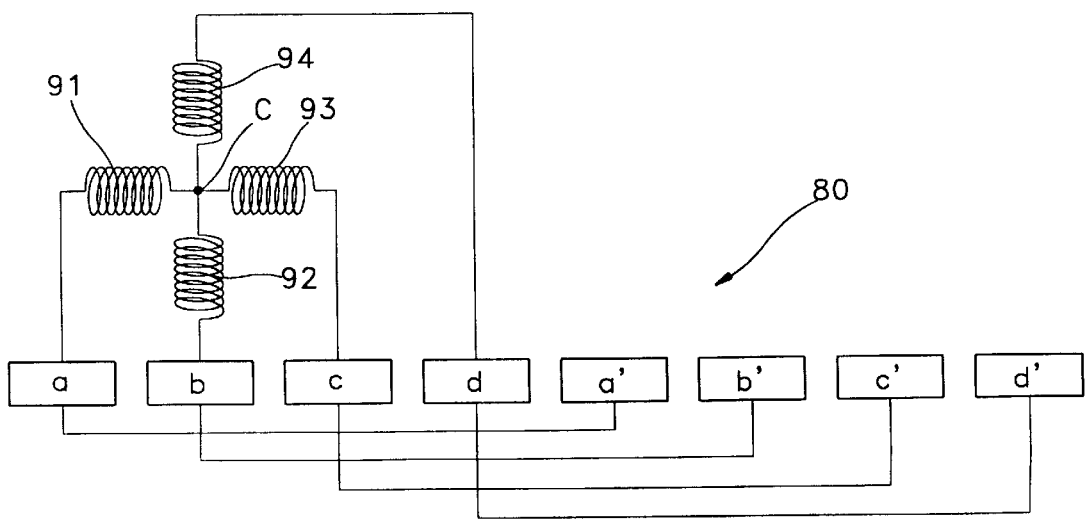
FIG. 15 is a connecting diagram showing connections between brushes and a commutator when a magnet is four-polar.

FIG. 15 illustrates connection between the segment of the commutator 80 and the coil unit 90 in a circuit having a four-polar magnet.

When the magnet 50 is four-polar, the number of the segments of the commutator 80 is eight, double the number of the poles. The four segments are respectively connected to four armature coils in order in a rotating direction, and the armature coils are connected to each other at a neutral point C.

In addition, since the remaining four segments not connected to the armature coils directly are respectively connected to the four segments connected to the armature coils directly, the actual structure is the same as that of the circuit having a 2-polar magnet.

The interval angle between the brushes in a circuit having four segments is greater than an electric angle of Π/2 and less than an electric angle of 3Π/2 (a mechanical angle greater than 90° and less than 270°).

The range of the interval angle may be divided into two. One is the range of the interval angle greater than an electric angle of Π/2 and less than an electric angle of Π, and the other is the range of the interval angle greater than an electric angle of Π and less than an electric angle of 3Π/2.

Figure 16:
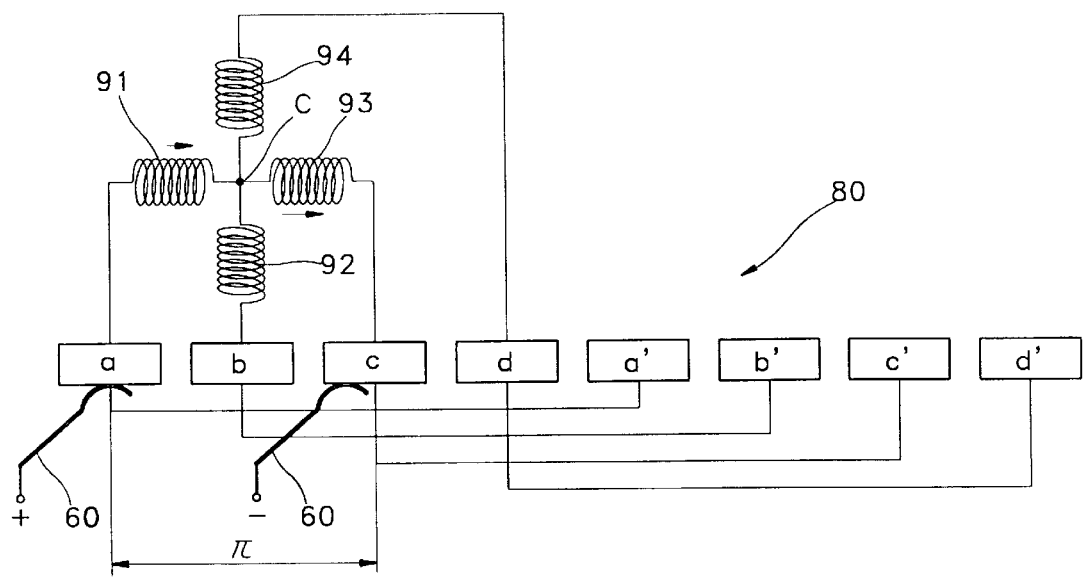
FIG. 16 is a connecting diagram showing connections between brushes and a commutator when a magnet is four-polar and an interval angle between two brushes is greater than an electric angle of $\Pi/2$ and less than an electric angle of $\Pi$.

FIG. 16 illustrates a circuit wherein the magnet 50 has four poles and an interval angle of brushes 60 to be contacted with the commutator 80 is greater than an electric angle of Π/2 and less than an electric angle of Π (a mechanical angle greater than 45° and less than 90°). The commutator segments contacted by the brushes 60 while the upper PCB 70 is rotated are listed in the following table 3.

TABLE 3

|  | Power input brush | Power output brush |
| --- | --- | --- |
| First stage | a | b |
| Second stage | a | c |
| Third stage | b | c |
| Fourth stage | b | d |
| Fifth stage | c | d |
| Sixth stage | c | a' |
| Seventh stage | d | a' |
| Eighth stage | d | b' |
| Ninth stage | a' | b' |
| Tenth stage | a' | c' |
| Eleventh stage | b' | c' |
| Twelfth stage | b' | d' |
| Thirteenth stage | c' | d' |
| Fourteenth stage | c' | a |
| Fifteenth stage | d' | a |
| Sixteenth stage | d' | b |

As known in table 3, when an interval angle of brushes 60 is greater than an electric angle of Π/2 and less than an electric angle of Π, the commutator segments contacted by the brushes 60 are similar to those in table 1.

This embodiment is different from the embodiment concerning table 1 in that segments a', b', c' and d' are additionally provided. However, since the segments a', b', c' and d' are respectively connected to the segments "a", "b", "c" and "d", electric current is introduced to the coil unit 90 through the segments "a", "b", "c" or "d" when each of two brushes 60 contact each of segments a', b', c' and d'. Therefore, this circuit operates the same as the circuit wherein each of the brushes 60 directly contacts each of the segments "a", "b", "c" or "d".

One of the brushes 60 contacts segments "a", "b", "c", "d", a', b', c' and d' in order. Electric current inputted or outputted through the brushes 60 contacted with segments a', b', c' and d' should be inputted or outputted through the segments "a", "b", "c" and "d".

Therefore, even in the structure wherein the magnet 50 is four-polar and the number of the segments of the commutator 80 is eight, electric current flows in the coil unit 90 on the upper PCB 70 all the time, thereby generating driving force by interaction between magnet 60 and the coil 90.

Figure 17:
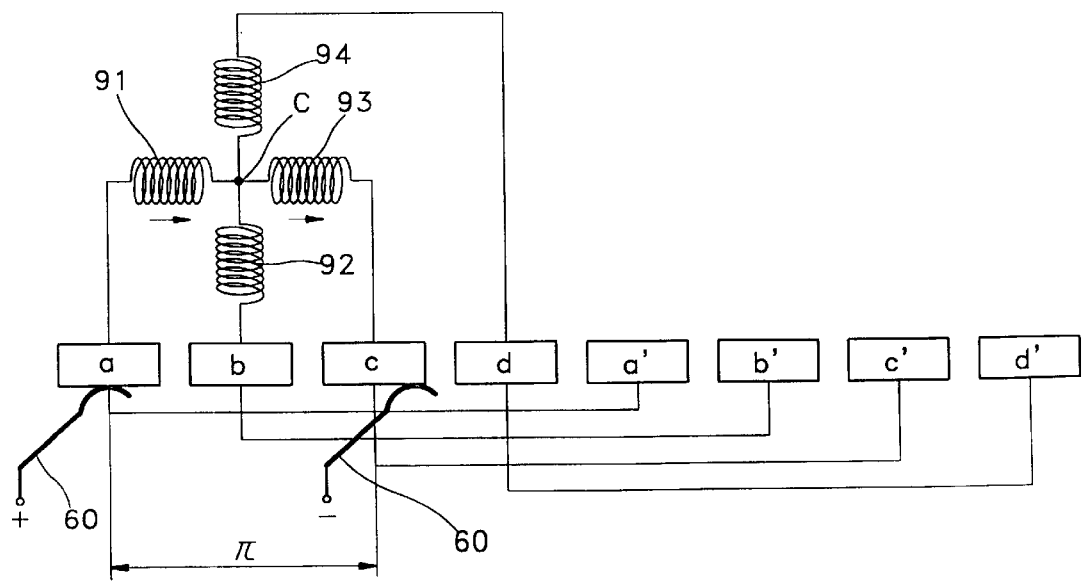
FIG. 17 is a connecting diagram showing connections between brushes and a commutator when a magnet is two-polar and an interval angle between two brushes is greater than an electric angle of $\Pi$ and less than an electric angle of $3\Pi/2$.

FIG. 17 illustrates a circuit wherein the magnet 50 is four-polar and an interval angle of brushes 60 to be contacted with the commutator 80 is greater than an electric angle of Π and less than an electric angle of 3Π/2 (a mechanical angle greater than 90° and less than 180°). The commutator segments contacted by the brushes 60 while the upper PCB 70 is rotated are listed in the following table 4.

TABLE 4

|  | Power input brush | Power output brush |
| --- | --- | --- |
| First stage | a | c |
| Second stage | a | d |
| Third stage | b | d |
| Fourth stage | b | a' |
| Fifth stage | c | a' |
| Sixth stage | c | b' |
| Seventh stage | d | b' |
| Eighth stage | d | c' |
| Ninth stage | a' | c' |
| Tenth stage | a' | d' |
| Eleventh stage | b' | d' |
| Twelfth stage | b' | a |
| Thirteenth stage | c' | a |
| Fourteenth stage | c' | b |
| Fifteenth stage | d' | b |
| Sixteenth stage | d' | c |

As known in table 4, when an interval angle of brushes 60 is greater than an electric angle Π and less than an electric angle of 3Π/2, the commutator segments contacted by the brushes 60 are similar to those in table 2.

This embodiment is different from the embodiment concerning table 2 in that segments a', b', c' and d' are additionally provided. However, since the segments a', b', c' and d' are respectively connected to the segments "a", "b", "c" and "d", electric current is introduced to the coil unit 90 through the segments "a", "b", "c" or "d" when each of two brushes 60 contact each of segments a', b', c' and d'. Therefore, this circuit operates the same as the circuit wherein each of the brushes 60 directly contacts each of the segments "a", "b", "c" or "d".

When segments "a", "b", "c", "d", a', b', c' and d' are arranged in order toward the rotating direction of the upper PCB 70 and the two brushes 60 are connected to the segments with the brushes 60 having an interval angle greater than an electric angle Π and less than an electric angle of Π/2, the two brushes 60 are respectively connected to two or more armature coils 90, that is, the input armature coil and the output coil, thereby allowing current to flow through them. Therefore, when the motor of this invention has a two-phase driving characteristic, continuous driving is accomplished.

On the other hand, the motor has a two-phase driving characteristic mostly when the brushes 60 contact the commutator 80 with the brushes 60 maintaining an interval angle of Π precisely, while current flows in all the four armature coils 91, 92, 93 and 94 and the motor has a four-phase driving characteristic when each of the brushes 60 contacts two segments at the same time.

In brief, when four armature coils 91, 92, 93 and 94 are provided in the motor, commonly connected to each other at the neutral point C and are arranged in order at a certain electric angle, the motor has the two-phase driving characteristic and intermittently the four-phase driving characteristic when the brushes 80 have an interval angle of Π, while the motor has only the two-phase driving characteristic when the brushes 80 have an interval angle greater than an electric angle Π/2 and less than an electric angle of Π, or greater than an electric angle Π and less than an electric angle of 3Π/2. As a result, a stable driving may be accomplished.

Figure 18:
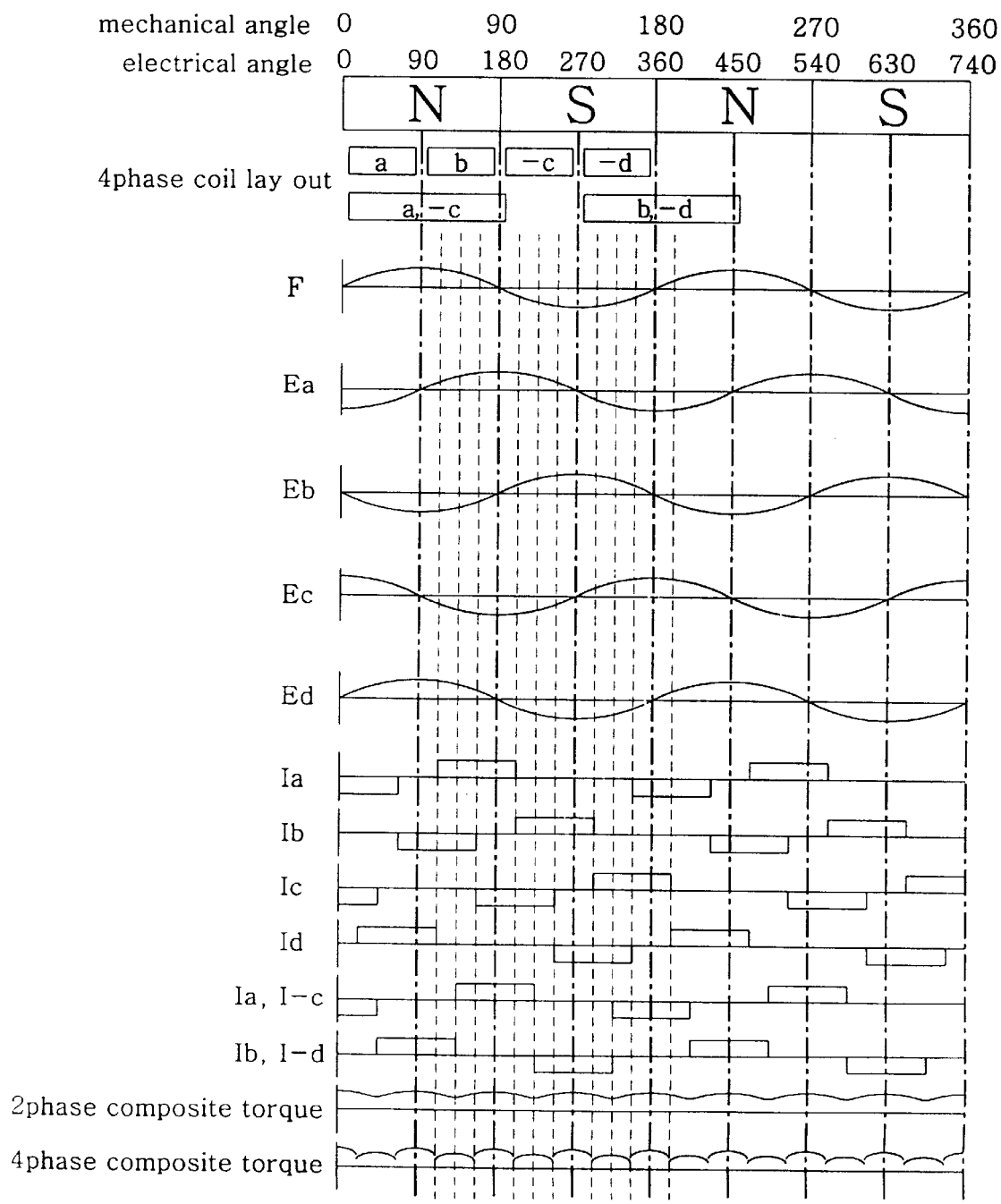
FIG. 18 illustrates an operation diagram showing the driving characteristics according to this invention.

FIG. 18 illustrates an operation diagram showing the driving characteristics according to this invention. In the diagram, the armature coils 91, 92, 93 and 94 respectively have an electric phase difference of Π/2 with respect to next coil, and "–" means that the coil is wound in an opposite direction.

As described above, according to this embodiment, the four armature coils 91, 92, 93 and 94 are commonly connected to each other at the neutral point C and each of the armature coils 91, 92, 93 and 94 has a phase difference of Π/2. This is advantageous in that setting of an interval angle between brushes 60, which is most difficult in motor manufacturing, may be freely performed.

In particular, the coil unit is divided into four armature coils. A pair of armature coils having opposite wound directions are overlapped so as to form a coil stack, or four coils having the same wound direction are individually arranged on the same plane of the upper surface of the upper PCB 70. Therefore, the motor of this invention is similar to the conventional two-phase driving motor in manufacture.

However, according to this invention, since an interval angle between the brushes 60 may be freely set, the mounting of the brushes 60 may be easily performed.

Since the armature coils of the coil unit are connected to each other at a neutral point C, a current-free range, which is generated in the conventional two-phase driving motor, is eliminated completely, thus allowing a stable driving to be maintained.

As described above, according to this invention, a dead point in a single phase driving motor, a current-free range in a two-phase driving motor and a complex construction in a three-phase driving motor are eliminated at the same time. Additionally, mechanical manufacturing errors are eliminated. Therefore, this invention improves productivity and manufacturing efficiency. In addition, this invention improves reliability on performance of the motor by providing a stable driving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flat-shaped vibration motor, comprising;
   a base plate;
   a cover covering the base plate so as to define a space for installing elements therein;
   a shaft vertically and rotatably mounted between a center of the base plate and a center of the cover;
   a lower PCB mounted on a upper surface of the base plate;
   a magnet positioned outside the lower PCB and having 2n poles (n: a positive integer);
   an upper PCB fitted around the shaft and unbalanced in weight;
   a commutator positioned on a central lower portion of the upper PCB and including multiple segments;
   a pair of brushes mounted between the lower PCB and the commutator with their lower ends respectively and electrically connected to the lower PCB and their upper ends in contact with the commutator, an interval angle between the brushes being greater than an electric angle of Π/2 and less than an electric angle of 3Π/2; and
   a coil unit consisting of multiple elemental armature coils, the armature coils being connected to each other into the coil unit at a neutral point and being activated in order, and each having an electric phase difference increasing by Π/2 in the order of activation
   said coil unit being constructed in the form of a coil stack, the coil stack being made by stacking two armature coils wound in opposite directions, the coil stacks having an electrical phase difference increasing by Π/2 in the order of activation.

2. The motor according to claim 1, wherein each of said armature coils has a coil pitch of an electric angle of Π.

3. The motor according to claim 1, wherein each of said armature coils has a coil pitch of an electric angle of Π/2.

4. A flat-shaped vibration motor, comprising;
   a base plate;
   a cover covering the base plate so as to define a space for installing elements therein;
   a shaft vertically and rotatably mounted between a center of the base plate and a center of the cover;
   a lower PCB mounted on a upper surface of the base plate;
   a magnet positioned on the upper surface of the base plate and outside the lower PCB and having 2n poles (n: a positive integer);
   an upper PCB fitted around the shaft and unbalanced in weight;
   a commutator positioned on a central lower portion of the upper PCB and including 2n segments;
   a pair of brushes mounted between the lower PCB and the commutator with their lower ends connected to the lower PCB and their upper ends in contact with the commutator, an interval angle between the brushes being greater than an electric angle of Π/2 and less than an electric angle of 3Π/2;
   a coil unit including at least four armature coils, the armature coils being connected to each other at a neutral point and being activated in order, and each having an electric phase difference increasing by Π/2 in the order of activation; and
   wherein said armature coils have the same wound direction and are individually arranged in the same plane of an upper surface of the upper PCB.

5. The motor according to claim 4, wherein each of said armature coils has a coil pitch of an electric angle of Π/2.